(12) United States Patent
Fornos et al.

(10) Patent No.: US 11,020,905 B2
(45) Date of Patent: Jun. 1, 2021

(54) ACCURACY IMPROVEMENT AND SURFACE FINISHING USING FUSING AGENT AND DETAILING AGENT

(71) Applicant: HEWLETT-PACKARD DEVELOPMENT COMPANY, L.P., Houston, TX (US)

(72) Inventors: Pol Fornos, Barcelona (ES); Manuel Freire, Sant Cugat del Valles (ES); Luis Garcia, Les Roquetes (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 221 days.

(21) Appl. No.: 16/085,487

(22) PCT Filed: Mar. 24, 2016

(86) PCT No.: PCT/EP2016/056673
§ 371 (c)(1),
(2) Date: Sep. 14, 2018

(87) PCT Pub. No.: WO2017/162306
PCT Pub. Date: Sep. 28, 2017

(65) Prior Publication Data
US 2019/0091936 A1    Mar. 28, 2019

(51) Int. Cl.
*B29C 64/393*    (2017.01)
*B29C 64/165*    (2017.01)
(Continued)

(52) U.S. Cl.
CPC .......... *B29C 64/393* (2017.08); *B29C 64/165* (2017.08); *B29C 64/20* (2017.08);
(Continued)

(58) Field of Classification Search
CPC .......................... B29C 54/165; B29C 54/393
See application file for complete search history.

(56) References Cited

U.S. PATENT DOCUMENTS

| | | |
|---|---|---|
| 6,363,606 B1 | 4/2002 | Johnson, et al. |
| 6,994,549 B2 | 2/2006 | Brodkin |

(Continued)

FOREIGN PATENT DOCUMENTS

| | | | |
|---|---|---|---|
| WO | WO 2015/106816 | * | 7/2015 |
| WO | WO-2015167520 | | 11/2015 |

(Continued)

OTHER PUBLICATIONS

HP Multi Jet Fusion™ technology, 4AA5-5472ENW, Nov. 2015, Rev.4, HP Development Company, L.P., United States of America, 8 pages.

(Continued)

*Primary Examiner* — Austin Murata
(74) *Attorney, Agent, or Firm* — HP Inc. Patent Department

(57) ABSTRACT

Examples of additive manufacturing are described. In one example, a method comprises generating print data to cause application of fusing agent to a first region of a layer of build material of an object undergoing additive manufacturing, the first region corresponding to an inner region of an object undergoing additive manufacturing. The print data causes application of fusing agent and detailing agent to a second region of the layer, the second layer corresponding to a middle region of the object. The print data causes application of detailing agent to a third region of the layer, the third region corresponding to an outer layer of the object. Fusing energy is applied to the layer.

20 Claims, 3 Drawing Sheets

(51) Int. Cl.
- *B33Y 10/00* (2015.01)
- *B33Y 30/00* (2015.01)
- *B33Y 50/02* (2015.01)
- *B29C 64/20* (2017.01)

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | |
|---|---|---|
| 7,552,569 B2 | 6/2009 | Rotherroe |
| 2004/0005374 A1 | 1/2004 | Narang et al. |
| 2006/0131770 A1 | 6/2006 | Dierkes et al. |
| 2014/0252672 A1* | 9/2014 | Rael ........................ C04B 41/63 264/128 |
| 2014/0271961 A1 | 9/2014 | Khoshnevis |
| 2015/0343673 A1 | 12/2015 | Williams |
| 2016/0339636 A1* | 11/2016 | De Pena ................ B33Y 50/02 |
| 2017/0113413 A1* | 4/2017 | Iwase ..................... B29C 64/40 |

FOREIGN PATENT DOCUMENTS

| WO | WO-2015167530 | 11/2015 |
|---|---|---|
| WO | WO-2016010590 | 1/2016 |

OTHER PUBLICATIONS

International Search Report and Written Opinion for International Publication No. PCT/EP2016/056673 dated Dec. 12, 2016, 13 pages.

\* cited by examiner

ACCURACY IMPROVEMENT AND SURFACE FINISHING USING FUSING AGENT AND DETAILING AGENT

BACKGROUND

Additive manufacturing systems that generate three-dimensional objects, including those sometimes referred to as "3D printers", have been proposed as a potentially convenient way to produce three-dimensional objects. In these systems, materials may be deposited in layers upon a print bed. It is frequently desirable to improve the accuracy and uniformity of the shape of objects produced by additive manufacturing, and also to improve color uniformity.

BRIEF DESCRIPTION OF THE DRAWINGS

Various features of the present disclosure will be apparent from the detailed description which follows, taken in conjunction with the accompanying drawings, which together illustrate features of certain examples, and wherein.

DETAILED DESCRIPTION

Figure 1:
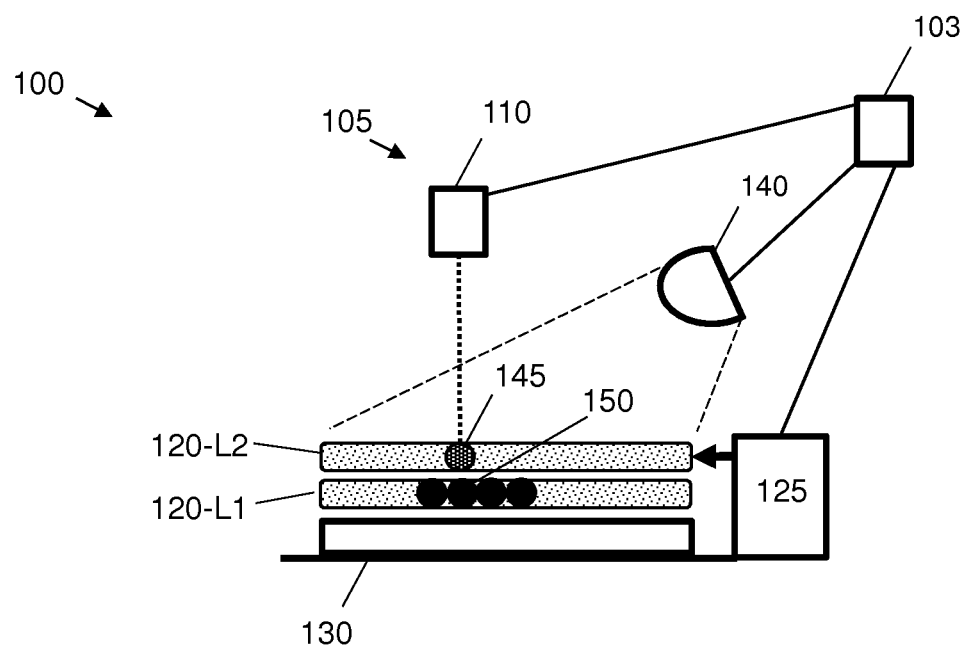
FIG. 1 is a schematic diagram of an additive manufacturing system according to an example.

One additive manufacturing process generates an object by selectively solidifying portions of successive layer of build material. For example, a fusing agent may be selectively applied to a layer of build material and fusing energy applied to the layer of build material. Those portions of the build material on which fusing agent is applied absorb more fusing energy than those portions on which no fusing agent is applied and heat up sufficiently to cause those portions to fuse or solidify. However, due to thermal bleed, portions of a layer of build material on which no fusing was applied may adhere to a solidified portion, which may reduce surface properties of the object, such as color or shape accuracy. FIG. 1 shows an additive manufacturing system 100 according to an example. In the example of FIG. 1 the additive manufacturing system 100 comprises a controller 103. The controller 103 is configured to generate print data for controlling an additive manufacturing process. In examples, the controller 103 is a component of an additive manufacturing device, for example an integrated circuit. In other examples, the controller 103 is a computing device communicatively coupled to a 3D printing device. The controller 103 controls an inkjet deposit mechanism 105 to print a plurality of liquid agents onto layers of a build material, for example a powder such as a powdered polymer substrate.

In FIG. 1, an inkjet deposit mechanism 105 comprises at least one print head 110. Each of the at least one print heads 110 is adapted to deposit at least one agent onto a build material 120. In particular, each print head 110 is arranged to deposit at least one agent upon defined areas within a plurality of successive layers of build material. In some examples, separate print heads 110 are configured to deposit a fusing agent and a detailing agent. A detailing agent may be used to modify the effects of a fusing agent and/or may be used alone to reduce thermal bleed effects. In other examples, the same print head 110 is configured to deposit both fusing agent and detailing agent. The at least one print head 110 may comprise pens wherein the pens comprise separate trenches, each trench being configured to deposit fusing agent and detailing agent. The at least one print head 110 may be situated in a carriage configured to move over a build surface 130.

In FIG. 1, the controller 103 controls a build material supply mechanism 125 to deposit build material onto a build surface 130 such as a platen or other support, to deposit at least one layer of build material. The plurality of liquid agents are deposited onto this layer by the at least one print head 110. In an example the build material supply mechanism 125 supplies successive layers of build material. Successive layers form a build volume. Two layers are shown in FIG. 1: a first layer 120-L1 upon which a second layer 120-L2 has been deposited by the build material supply mechanism 125. In certain cases, the build material supply mechanism 125 is arranged to move relative to the build surface 130 such that successive layers are deposited on top of each other. In this case, following "printing" of the liquid agents, the layer 120-L2 upon the print bed comprises a mixture of the powdered build material and any deposited agent liquid.

In the present example, the additive manufacturing system also comprises an energy source 140, which may for example comprise a halogen lamp or an incandescent lamp, which is controlled by the controller 103 to apply energy to form portions of the three-dimensional object from combinations of the agents and the powdered build material. For example, FIG. 1 shows the at least one print head 110 depositing a controlled amount of fusing agent onto an addressable area of the second layer 120-L2 of powdered build material. The print data may be based on an object model, such that the amount and location of liquid agent applied to the layer of build material is based on the object model.

Following application of the agent, the controller 103 controls the energy source 140 to apply fusing energy to all or a portion of the layer 145. The fusing agent may act as an energy absorber such that regions of build material to which fusing agent is applied absorb sufficient fusing energy to exceed the crystallization temperature of the build material and thus fuse. The layer 120-L2 is built on top of lower layer 120-L1. In examples, fusing occurs between layers as well as within layers such that the region 145 of layer 120-L2 to which fusing agent is applied fuses with adjacent region 150 of layer 120-L1 to which fusing agent was applied.

Use of fusing and detailing agents may allow a three-dimensional object to have varying material properties. Lower layers of build material may also provide support for overhanging fixed portions of a three-dimensional object, wherein at the end of production any non-solidified build material may be separated from solidified build material forming the completed object.

Figure 2:
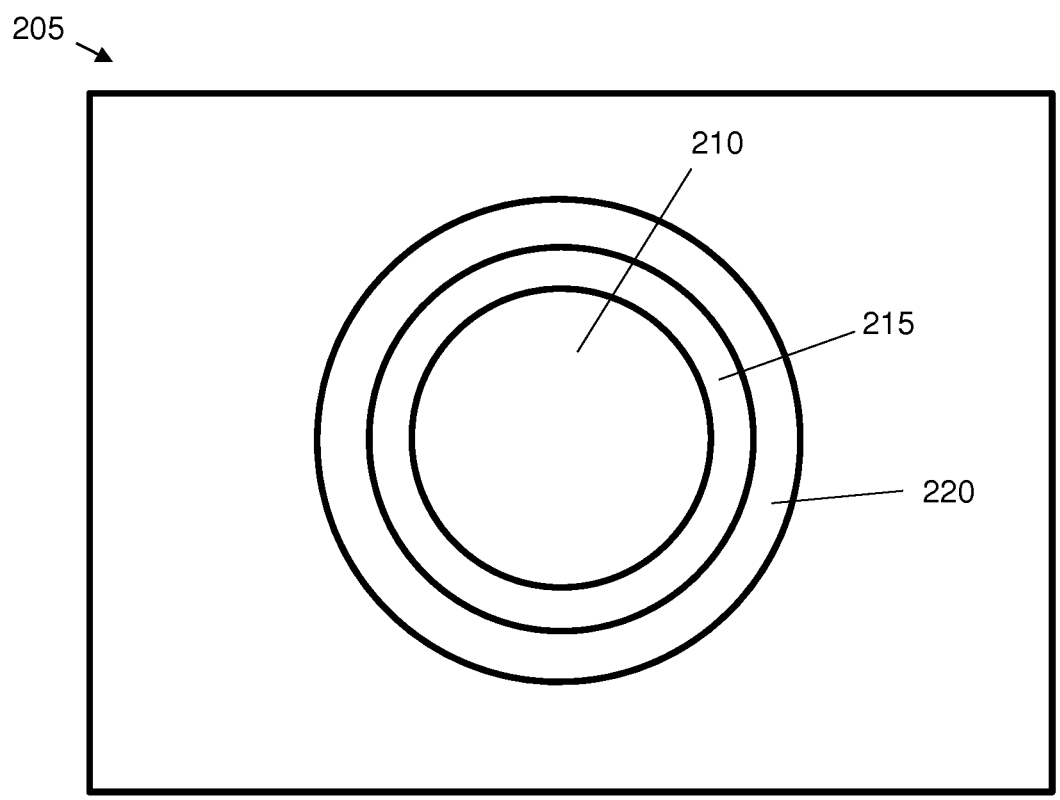
FIG. 2 is a schematic diagram of a layer of build material for an object undergoing additive manufacture according to an example.

FIG. 2 shows a schematic representation of a layer 205 of build material on a build surface. According to an example of the present disclosure, the controller 103 controls the at least one print head 110 to, on the basis of the generated print data, apply fusing agent to a first region 210 of the layer 205, apply fusing agent and detailing agent to a second region 215 of the layer, and apply detailing agent to a third region 220 of the layer. The first region 210 corresponds to an inner region of an object undergoing additive manufacture. The second region 215 corresponds to a middle region of the object. The third region 220 corresponds to an outer region of the object. In some examples, the layer 205 comprises regions corresponding to multiple objects undergoing additive manufacture. A combination of fusing agent and detailing agent is thus applied to the second region 215. In one example, 4 nanograms of fusing agent per $\frac{1}{600}$ inch$^2$ and 25 nanograms of detailing agent per $\frac{1}{600}$ inch$^2$ are applied to the second region 215. This combination may be termed "detailing agent clash".

In an example, the controller 103 controls the at least one print head 110 to simultaneously apply fusing agent and detailing agent to the second region 215. In some examples, all of the fusing and detailing agent is applied in a single pass, such that agents are simultaneously applied to regions 210, 215 and 220. In other examples, the at least one print head 110 is controlled to apply fusing agent and detailing agent in a non-simultaneous or partially simultaneous manner. For example, application of each agent may be interleaved.

In other examples, agents may be applied in separate passes of the at least one print head 110 over the build surface 130. For example, fusing agent may be applied to the first region 210 and fusing and detailing agents may be applied to the second region 215 during a first pass, and detailing agent may be applied to the third region 220 during a second pass. Following application of the fusing agent and detailing agent, the energy source 140 applies fusing energy to the layer 205.

In an example of the present disclosure, as a consequence of the application of detailing agent to the second region 215 and not to the first region 210, the application of fusing energy to the layer 205 fuses the first region 210 more than the second region 215. In some examples, the first region 210 is completely fused. Further, as a consequence of the application of fusing agent to the second region 215 and not to the third region 220, the application of fusing energy to the layer 205 may fuse the second region 215 more than the third region 220.

In some examples, print data is generated such that a varying proportion of fusing and detailing agents is applied across the second region 215, such that the proportion of fusing agent varies smoothly from 100% in portions of the second region 215 adjacent to the first region 210, to 0% in portions of the second region 215 adjacent to the third region 220. Similarly, in such examples the proportion of detailing agent varies smoothly from 0% in portions of the second region 215 adjacent to the first region 210, to 100% in portions of the second region 215 adjacent to the third region 220.

Figure 3A:
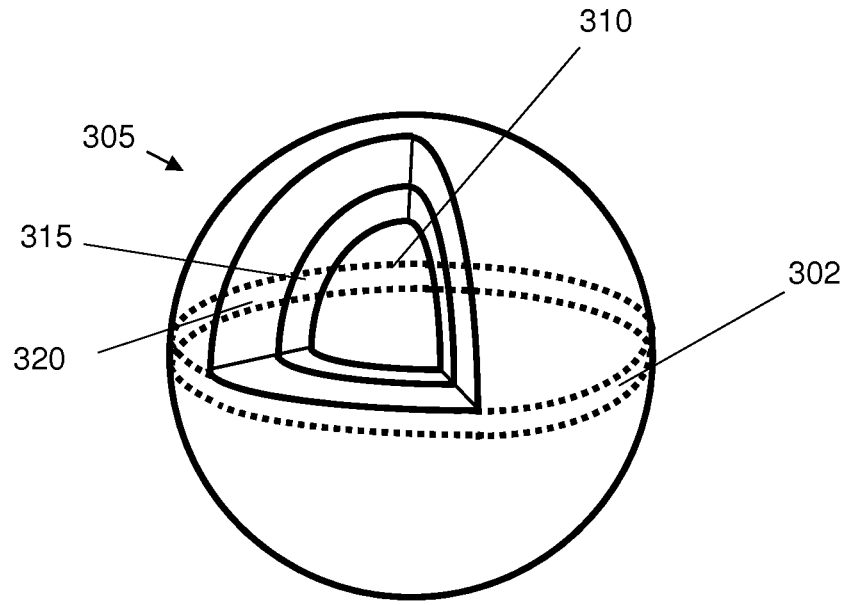
FIGS. 3A and 3B are schematic diagrams of an example object produced by additive manufacture.

As explained above, the object undergoing additive manufacture is manufactured in layers. FIG. 3A shows a schematic representation of an example of such an object 305 comprising a layer 302 corresponding to the layer 205 of FIG. 2, with a portion removed to illustrate the internal structure. Although FIG. 3A shows one layer 205 for clarity, the object comprises multiple layers which are similarly produced. The object comprises an inner volume 310 comprising the first region 210 of the layer 205, a middle volume 315 comprising the second region 215 of the layer 205, and an outer volume 320 comprising the third region 220 of the layer 205. Following manufacture, the object 305 undergoes post-processing. Post-processing may comprise abrasive post-processing, for example comprising sandblasting. In an example, post-processing comprises removing an exterior portion of the object. In one example, removing the exterior portion comprises completely removing the outer volume 320, and thus completely removing the third region 220 of the layer 205. In a further example, removing the exterior portion comprises partially removing the middle volume 315, and thus partially removing the second region 215 of the layer 205.

Figure 3B:
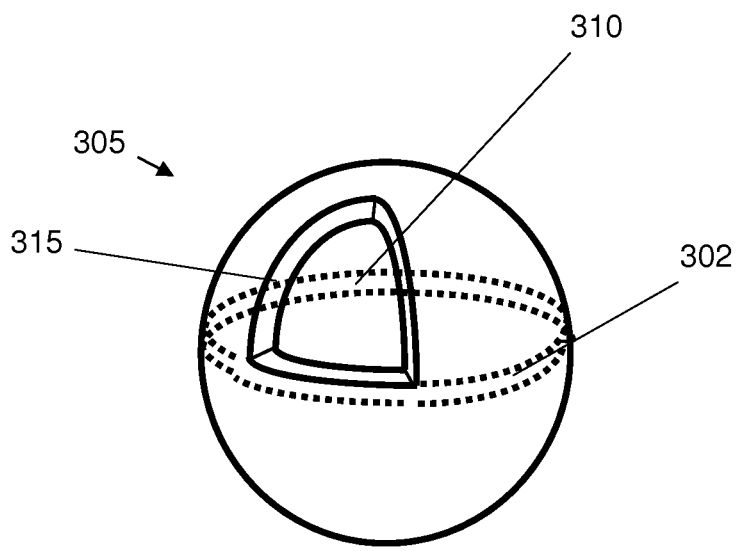

FIG. 3B is a schematic representation of the object 305 following removal of the exterior portion. The outer volume 320 has been removed, and the middle volume 315 has been partially removed. The amount of material removed may depend on the quantities of fusing and detailing agent applied to the second region 215 of the layer 205, and detailing agent applied to the third region 220. In examples of the present disclosure, the exterior portion is removed by erosion, for example by one or more of blasting with sand or other blast material, and/or by application of compressed air.

As a consequence of the combination of fusing agent and detailing agent applied to the second region 215 and the detailing agent applied to the third region 220, during fusing, the second 215 and third 220 regions achieve lower temperatures than the first region 210. This prevents an excess of energy from being delivered to the second 215 and third 220 regions, and thus reduces or eliminates thermal bleed. This permits the removal of the exterior portion of the object 305 to be more precise than in systems in which a combination of fusing and detailing agents is not applied to a second region 215 of the layer 205. As such, examples of the present disclosure allow increased dimensional accuracy of the object 305 following post-processing, with reduced surface roughness and/or improved color uniformity.

According to one example, removal of the exterior portion of the object 305 comprises completely removing the outer volume 320 and the middle volume 315. In such an example, all of the partially fused build material is removed from the object 305 and the completely fused inner volume 310 is exposed. This allows production of an object 305 with high color stability and uniformity.

In an example, the controller 103 controls the at least one print head 110 to, based on the print data, apply a varying amount of fusing agent across the second region 215 of the layer 205, and a varying amount of detailing agent across the second region 215. For example, first amounts of fusing agent and of detailing agent may be applied to a first part of the second region 215, and second amounts of fusing agent and detailing agent may be applied to a second part of the second region 215. At least one of these varying amounts may be randomly varied across the second region 215, such that the quantity of fusing and/or detailing agent applied to a given portion of the second region 215 will exhibit one or more random or pseudo-random characteristics. For example, first random amounts of fusing agent and of detailing agent may be applied to a first part of the second region 215, and second random amounts of fusing agent and of detailing agent may be applied to a second part of the second region 215. The first and second random amounts may be produced by a pseudo-random number generator, based on a predefined probability distribution. Varying the amounts of fusing and detailing agents in this manner facilitates more accurate erosion of the exterior portion of the object 305, and thus facilitates improved dimensional accuracy. The varying amounts of fusing agent and detailing agent, which may be referred to as "contone levels", may be calculated depending on desired final properties of the object 305. Detailing agent and fusing agent contone levels for each region 210, 215, 220 may be defined in a print mode.

In a further example, the at least one print head 110 is configured to apply a varying amount of detailing agent across the third region 220 of the layer 205. The amount of detailing agent may be a randomly varying amount of detailing agent. Varying the amount of detailing agent in this manner facilitates more accurate erosion of the exterior portion of the object 305, and thus facilitates improved dimensional accuracy.

Figure 4:
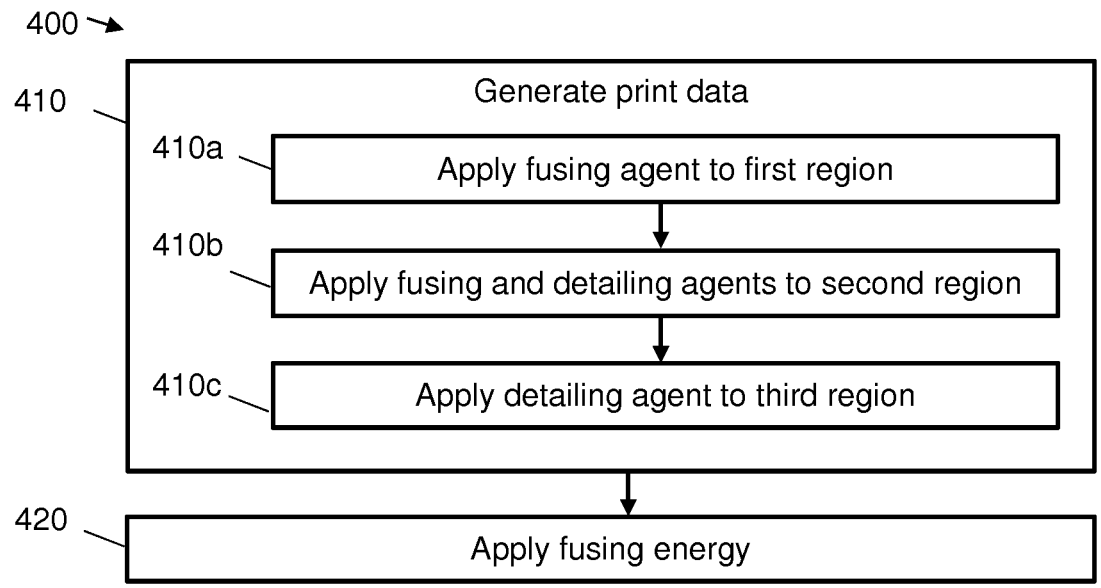
FIG. 4 is a flow chart showing a method of additive manufacture according to an example.

FIG. 4 is a flowchart showing a method 400 according to an example of the present disclosure. At block 410, print data is generated to cause application at block 410a of fusing agent to a first region 210 of a layer 205 of build material, the first region 210 corresponding to an inner region of an object undergoing additive manufacturing. At block 410b, the print data causes application of fusing and detailing agents to a second region 215 of the layer 205, the second region 210 corresponding to a middle region of the object. At block 410c, the print data causes detailing agent to be applied to a third region 220 of the layer 205, the third region corresponding to an outer region of the object. At block 420, fusing energy is applied to the layer. In some examples, blocks 410a-c may be performed in a different order to that shown and/or performed simultaneously.

In examples, in addition to causing the steps 410a-c, the print data causes the application 420 of fusing energy to the layer 205.

Generating print data may comprise receiving data defining an object to be printed, for example an object model, and modifying the received data to generate the print data.

In examples, the print data is generated by a computing device communicatively coupled with an additive manufacturing device. The computing device may for example run 3D computer-aided-design software. In other examples, the print data is generated by a component of an additive manufacturing device, for example an integrated circuit.

Figure 5:
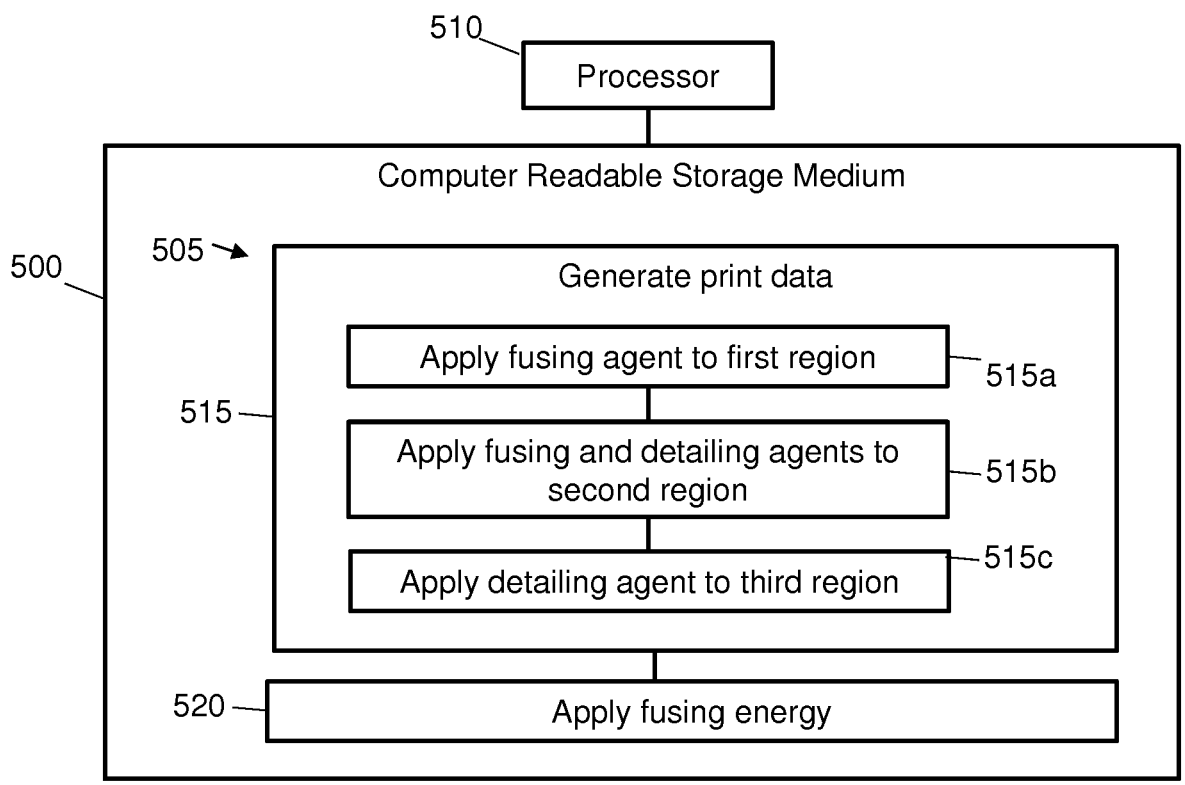
FIG. 5 is a schematic diagram showing an example set of computer-readable instructions within a non-transitory computer-readable storage medium.

FIG. 5 shows an example of a non-transitory computer-readable storage medium 500 comprising a set of computer readable instructions 505 which, when executed by at least one processor 510, cause the at least one processor 510 to perform a method according to examples described herein. The computer readable instructions 505 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In an example, instructions 505 cause the at least one processor 510 to, at block 515, generate print data to cause, at block 515a, application of fusing agent to a first region of a layer of build material, the first region corresponding to an inner region of an object undergoing additive manufacture. The layer may for example be the layer 205 depicted in FIG. 2.

At block 515b, the print data causes the application of fusing agent and detailing agent to a second region of the layer, the second region corresponding to a middle region of an object undergoing additive manufacture. In some examples, the print data causes simultaneous application of fusing agent and detailing agent to the second region. In other examples, the print data causes non-simultaneous application of fusing agent and detailing agent to the second region.

At block 515c, the print data causes the application of detailing agent to a third region of the layer, the region layer corresponding to an outer region of the object.

At block 520, the instructions cause the at least one processor 510 to apply fusing energy to the layer, to completely fuse the first region and partially fuse the second and third regions.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. An additive manufacturing system comprising:
a build material supply mechanism;
a printhead;
an energy source; and
a controller configured to:
control the build material supply mechanism to form a layer of build material;
control the print head to:
apply fusing agent and not apply detailing agent to a first region of the layer, the first region corresponding to an inner region of an object undergoing additive manufacture;
apply a varying amount of fusing agent and a varying amount of detailing agent to a second region of the layer contiguous with the first region, the second region corresponding to a middle region of the object, wherein the varying amount of fusing agent applied across the second region is a randomly varying amount of fusing agent and/or the varying amount of detailing agent applied across the second region is a randomly varying amount of detailing agent; and
apply detailing agent and not apply fusing agent to a third region of the layer contiguous with the second region and not contiguous with the first region, the third region corresponding to an outer region of the object; and
control the energy source to apply fusing energy to the layer.

2. An additive manufacturing system according to claim 1, wherein:
the varying amount of fusing agent applied across the second region is a randomly varying amount of fusing agent.

3. An additive manufacturing system according to claim 1, wherein:
the varying amount of detailing agent applied across the second region is a randomly varying amount of detailing agent.

4. An additive manufacturing system according to claim 1, wherein the controller is configured to control the print head to apply a varying amount of detailing agent across the third region.

5. An additive manufacturing system according to claim 4, wherein the amount of detailing agent applied across the third region is a randomly varying amount of detailing agent.

6. An additive manufacturing system according to claim 1, wherein the controller is configured to control the print head to simultaneously apply fusing agent and detailing agent to the second region.

7. A method of additive manufacturing, the method comprising:
generating print data to cause:
application of fusing agent and not detailing agent to a first region of a layer of build material of an object undergoing additive manufacturing, the first region corresponding to an inner region of an object undergoing additive manufacturing;
application of fusing agent and detailing agent to a second region of the layer, the second layer corresponding to a middle region of the object, including:
application of an amount of fusing agent and/or detailing agent that varies randomly across the second region; or
application of an amount of fusing agent that varies smoothly across the second region from a greater amount near the first region to a lesser amount near the third region and/or application of an amount of detailing agent that varies smoothly across the second region from a lesser amount near the first region to a greater amount near the third region; and
application of detailing agent to a third region of the layer, the third region corresponding to an outer layer of the object.

8. A method according to claim 7, wherein generating print data comprises:
receiving data defining an object to be printed; and
modifying the received data to generate the print data.

9. A method according to claim 7, comprising:
applying fusing energy to fuse the first region more than the second region; and
applying fusing energy to fuse the second region more than the third region.

10. A method according to claim 7, comprising removing an exterior portion of the object.

11. A method according to claim 10, wherein removing the exterior portion of the object comprises completely removing the third region of the layer.

12. A method according to claim 10, wherein removing the exterior portion of the object comprises partially removing the second region of the layer.

13. A method according to claim 10, wherein removing the exterior portion of the object comprises one or more of sandblasting and applying compressed air.

14. A method according to claim 7, wherein the application of fusing agent and detailing agent to the second region of the layer includes application of an amount of fusing agent that varies randomly across the second region and application of an amount of detailing agent that varies randomly across the second region.

15. A method according to claim 7, wherein the application of fusing agent and detailing agent to the second region of the layer includes application of an amount of fusing agent that varies smoothly across the second region from a greater amount near the first region to a lesser amount near the third region and application of an amount of detailing agent that varies smoothly across the second region from a lesser amount near the first region to a greater amount near the third region.

16. A non-transitory computer readable medium having computer readable instructions thereon that, when executed, generate print data that causes an additive manufacturing system to perform the method of claim 7.

17. An additive manufacturing system controller that includes the computer readable medium of claim 16.

18. A non-transitory computer-readable storage medium having computer-readable instructions thereon which, when executed, generate print data that causes an additive manufacturing system to:
apply fusing agent but not detailing agent to a first region of a layer of build material, the first region corresponding to an inner region of an object undergoing additive manufacture;
apply fusing agent and detailing agent to a second region of the layer contiguous with the first region, the second region corresponding to a middle region of the object;
apply detailing agent but not fusing agent to a third region of the layer contiguous with the second region and not contiguous with the first region, the third region corresponding to an outer region of the object; and
apply fusing energy to the layer to completely fuse the first region and partially fuse the second region, wherein the controller is configured to control the print head to:
apply fusing agent across the second region in an amount that varies from a greater amount near the first region and a lesser amount near the third region; and
apply detailing agent across the second region in an amount that varies from a lesser amount near the first region and a greater amount near the third region.

19. An additive manufacturing system according to claim 18, wherein:
the lesser amount of fusing agent is 0 and the amount of fusing agent applied across the second region varies smoothly from the greater amount to the lesser amount; and
the lesser amount of detailing agent is 0 and the amount of detailing agent applied across the second region varies smoothly from the lesser amount to the greater amount.

20. An additive manufacturing system controller that includes the computer readable medium of claim 18.

* * * * *